United States Patent
Zhong et al.

(10) Patent No.: US 7,751,714 B2
(45) Date of Patent: Jul. 6, 2010

(54) CENTRALIZED RESOURCE MANAGEMENT IN WAVELENGTH SELECTIVE SWITCH BASED WAVELENGTH CROSS CONNECT SYSTEMS

(75) Inventors: Lei Zhong, Princeton, NJ (US); Philip Nan Ji, Plainsboro, NJ (US); Ting Wang, Princeton, NJ (US); Osama Matsuda, Chiba (JP); Milorad Cvijectic, Herndon, VA (US)

(73) Assignee: NEC Laboratories America, Inc., Princeton, NJ (US)

( * ) Notice: Subject to any disclaimer, the term of this patent is extended or adjusted under 35 U.S.C. 154(b) by 160 days.

(21) Appl. No.: 11/737,922

(22) Filed: Apr. 20, 2007

(65) Prior Publication Data
US 2008/0260383 A1   Oct. 23, 2008

Related U.S. Application Data

(60) Provisional application No. 60/745,225, filed on Apr. 20, 2006.

(51) Int. Cl.
*H04J 14/02* (2006.01)

(52) U.S. Cl. .......................................... 398/83; 398/50
(58) Field of Classification Search .................. 398/48, 398/49, 50, 83, 84, 85
See application file for complete search history.

(56) References Cited

U.S. PATENT DOCUMENTS 7,184,666 B1 *   2/2007   Li et al. ........................ 398/83
2006/0133807 A1 *   6/2006   Jenkins et al. ................ 398/59

* cited by examiner

*Primary Examiner*—Nathan M Curs
(74) *Attorney, Agent, or Firm*—Brosemer, Kolefas & Associates

(57) ABSTRACT

A Centralized Resource Management (CRM) system that supports the sharing of all the transponders in a WXC node, i.e., any spare transponder can be reconfigured to accommodate any drop channel, regardless of wavelength or input port. Consequently, network restoration in case of network failures is supported as well as the ability to reconfigure as a result of dynamic traffic requirements in the network. CRM advantageously is applied to conventional WXC node as well as WSS-based WXC nodes in the WDM networks. Three CTM schemes which manage the transponders in the WSS-based WXC node are described along with reconfiguration algorithms for an optical switchless CRM solution.

3 Claims, 10 Drawing Sheets

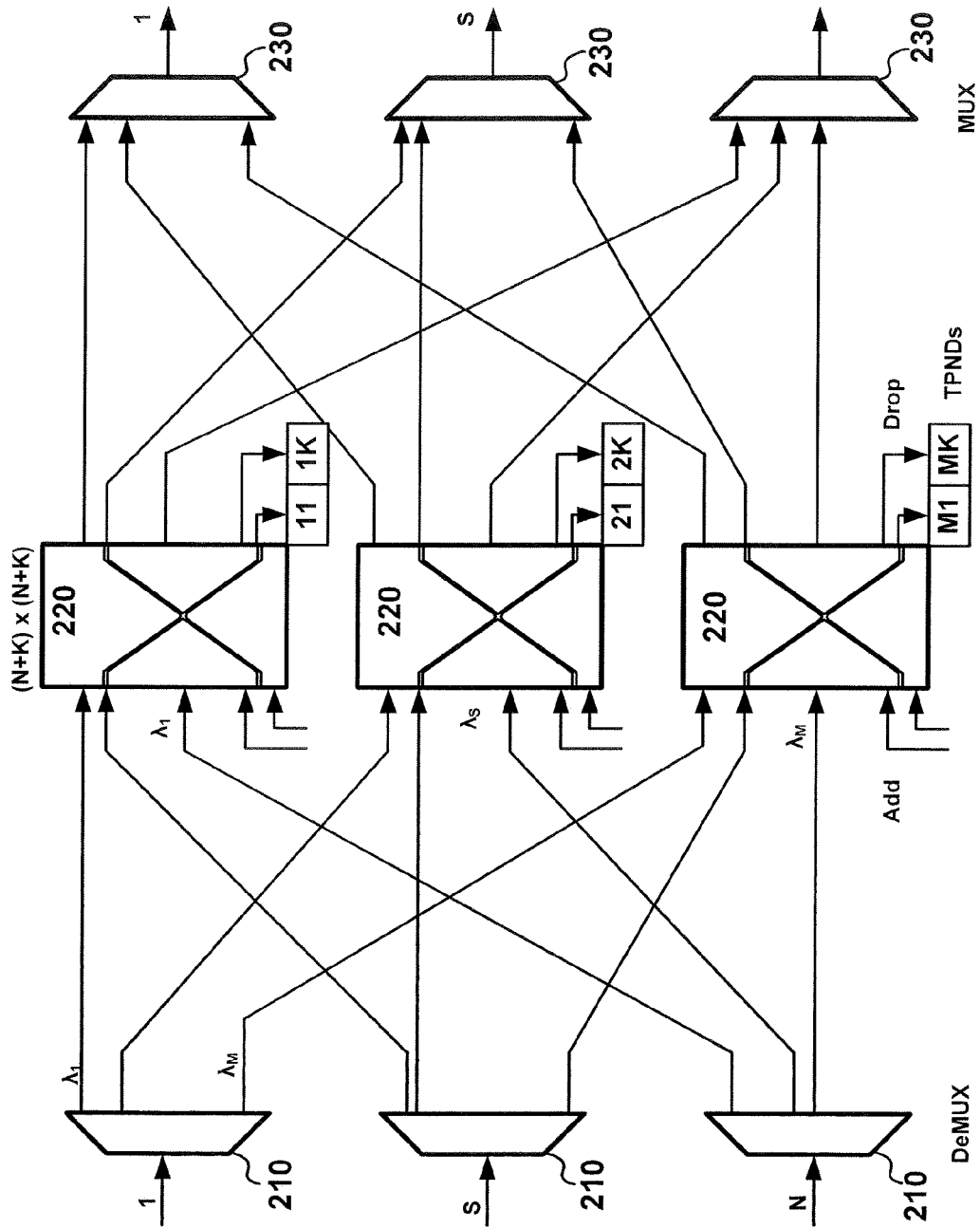
FIG. 2  *Prior Art*

140[8] service ports.

CENTRALIZED RESOURCE MANAGEMENT IN WAVELENGTH SELECTIVE SWITCH BASED WAVELENGTH CROSS CONNECT SYSTEMS

CROSS REFERENCE TO RELATED APPLICATIONS

This application claims the benefit of U.S. Provisional Application Ser. No. 60/745,225 filed on Apr. 20, 2006.

FIELD OF THE INVENTION

This invention relates generally to the field of optical telecommunications networks and in particular pertains to methods and associated devices for centralized resource management whereby transponders are advantageously shared in an optical node.

BACKGROUND OF THE INVENTION

Wavelength Selective Switches (WSS) are optical devices that may significantly enhance the flexibility of the optical switching nodes and networks (See, e.g., P. A. Bonenfant, and M. L. Jones, "OFC 2003 workshop on wavelength selective switching based optical networks," IEEE J. of Lightwave Technology, vol. 22, no. 1, pp. 305-309, 2004; Dan M. Marom, David T. Neilson, etc., "Wavelength-selective 1×K switches using free-space optics and MEMS micromirrors: theory, design, and implementation," IEEE J. Lightwave Technol., volume 23, 1620-1630 (2005); W. J. Tomlinson, "Wavelength-selective switching—architecture and technology overview," in OFC 2004, pp. 23-27; and L. Zong, P. Ji, T. Wang, O. Matsuda, M. Cvijetic, "Study on wavelength cross-connect realized with wavelength selective switches," OFC-NFOEC 2006.)

As is known in the art there are typically two types of WSS devices namely, a 1×N "drop" WSS and N×1 "add" WSS. With simultaneous reference to FIG. 1A and FIG. 1B, it may be observed that each type of WSS includes an input port 120, an Output port 130 and (N−1) 140[1] . . . 140[8] service ports. Advantageously a 1×N drop WSS can send any input wavelength or wavelength set therein to any of its service or output ports; while an N×1 add WSS can combine any wavelength or wavelength set therein to its output port.

Reconfigurable Optical Add/Drop Multiplexers (ROADMs) and Wavelength Cross-Connects (WXCs) are equally important elements found in contemporary wavelength division multiplexing (WDM) networks. Advantageously, they may provide cost-effective connection recovery in the event of link or node failures as compared to dedicated or shared-network protection schemes. Additionally, they also support automated network provisioning to accommodate dynamic traffic requirements (See, e.g., J. Strand, A. Chiu, "Realizing the advantages of optical reconfigurability and restoration with integrated optical cross-connect," IEEE J. of Lightwave Technology, vol. 21, no. 11, pp. 2871-2882, 2004; Mokhtar, A.; Benmohamed, L.; Bortz, M, "OXC port dimensioning strategies in optical networks-a nodal perspective," IEEE Communications Letters, Volume 8, Issue 5, May 2004 Page(s):283-285; Chi Guan; Chan, V. W. S, "Topology design of OXC-switched WDM networks," IEEE Journal on Selected Areas in Communications, Volume 23, Issue 8, August 2005 Page(s):1670-1686; and Vasilyev, M.; Tomkos, I.; Mehendale, M.; Rhee, J.-K.; Kobyakov, A.; Ajgaonkar, M.; Tsuda, S.; Sharma, M, "Transparent ultra-long-haul DWDM networks with broadcast-and-select OADM/OXC architecture," Journal of Lightwave Technology, Volume 21, Issue 11, November 2003 Page(s):2661-2672).

Given their importance to present and future optical networks, methods and apparatus that facilitate the functionality or management of these network elements would therefore represent a significant advance in the art.

SUMMARY OF THE INVENTION

An advance is made to the art according to the principles of the present invention in which a Centralized Transponder Management (CTM) scheme is employed within a WXC node thereby enabling the sharing of all the transponders in the node. In sharp contrast with the prior art and according to an aspect of the present invention, any transponder in the node can be reconfigured to accommodate any channel dropped inside the node. In addition, and according to another aspect of the present invention, network flexibility is enhanced as channels with varied wavelengths may be added and dropped as desired.

Advantageously, and according to an aspect of the present invention, two problems which plagued the prior art are advantageously solved. The first problem—a blocking problem—is that situation encountered in the event of network restoration and reconfiguration. As appreciated by those skilled in the art, this blocking problem is not encountered in conventional WXC, but it is a fatal problem in a WSS-based WXC node because re-routed channels can not be sent to their original transponders.

The second problem solved by the instant invention is that encountered when transponders are shared among different wavelengths. As those skilled in the art will recall, this problem is also associated with conventional WXC nodes. According to an aspect of the present invention however, there is no longer any limitation to how many channels of the same wavelength that can be dropped simultaneously in a node. Whenever there is a transponder available in the node, any channel can be dropped to it.

Advantageously, the present invention advantageously provides three separate approaches to solving these problems namely, a fully switching Centralized Resource Management scheme; a partial switching Centralized Resource Management scheme and a switchless Centralized Resource Management scheme.

BRIEF DESCRIPTION OF THE DRAWING

A more complete understanding of the present invention may be realized by reference to the accompanying drawings in which:

FIG. 2 is schematic diagram showing a conventional Wavelength Cross Connect Node;

DETAILED DESCRIPTION

Figure 1A:
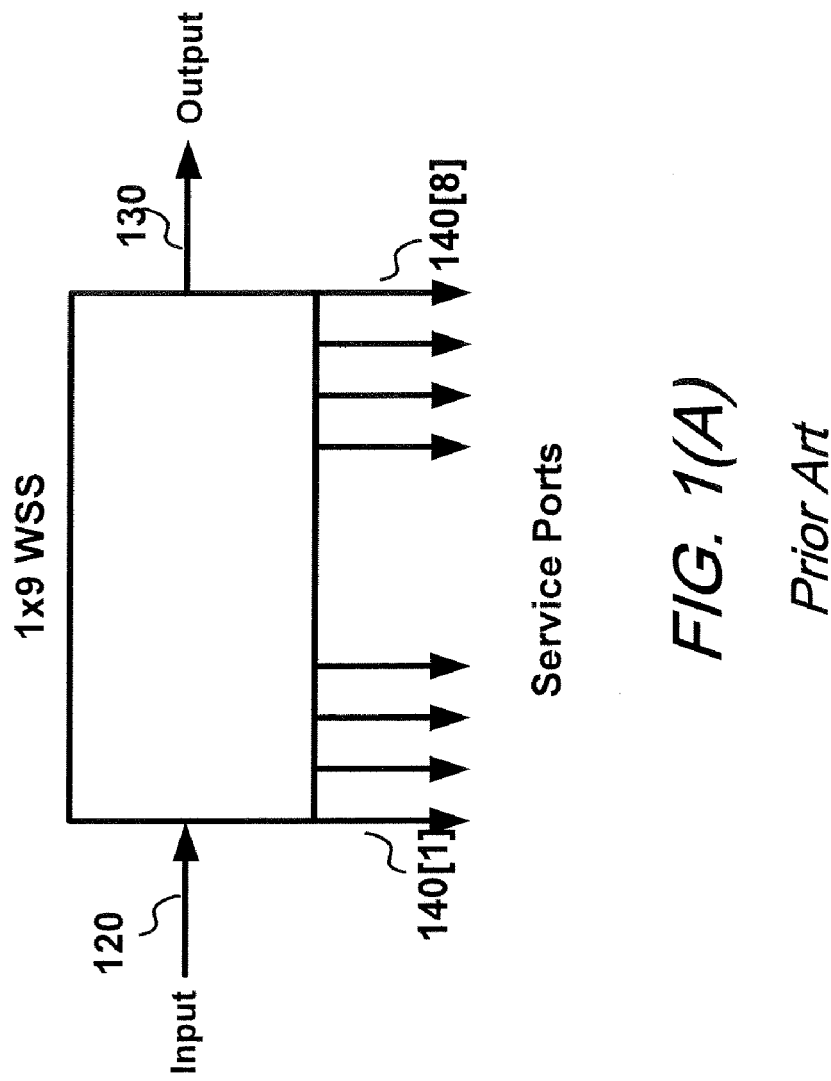
FIG. 1(A) is a schematic block diagram of a 1×9 Wavelength Selective Switch according to a drop model.
Figure 1B:
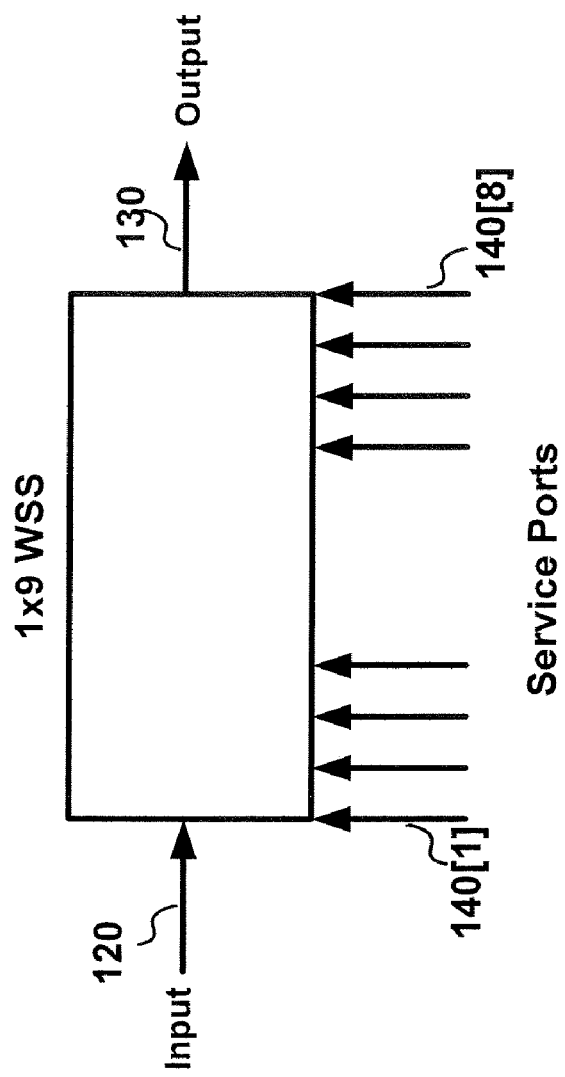
FIG. 1(B) is a schematic block diagram of a 1×9 Wavelength Selective Switch according to an add model.

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Centralized Resource Management in a Conventional WXC Node

Turning now to FIG. 2, there is shown a conventional WXC node including wavelength demultiplexers (DeMUX) 210, optical switches 220 ((N+K)×(N+K)) and multiplexers 230 (MUX) (See, e.g., E. Iannone, R. Sabella, "Optical path technologies: a comparison among different cross-connect architectures," *IEEE J. of Lightwave Technology*, vol. 14,no. 10, pp. 2184-2196, 1996; M. K. Panda, T. Venkatesh, V. Sridhar, Y. N. Singh, "Architecture for a class of scalable optical cross-connects," in BroadNets 2004, pp. 233-242; Castanon, G, "An optical cross connected architecture based on planar lightwave circuit switches," Workshop on High Performance Switching and Routing, 2005. HPSR. 2005 12-14 May, 2005 Page(s):264-268; and Xiaojun Cao; Anand, V.; Chunming Qiao, "Multilayer versus single-layer optical cross-connect architectures for waveband switching," INFOCOM 2004, Volume 3, 2004 Page(s):1830-184).

As can be appreciated by those skilled in the art, such a node capable of switching N input and output fibers with M wavelengths in each fiber requires a total of N demultiplexers and N multiplexers with 1×M and M×1 configuration, respectively, and M switches with N×N configuration. In addition, if add/drop functionality is required, the switch configuration employed must be (N+K)×(N+K), where K is the maximum number of channels that can be dropped simultaneously for each wavelength.

As is known by those skilled in the art, demultiplexers separate incoming multi-wavelength WDM signals into their individual component wavelengths. Then, channels having the same wavelengths but received at different input ports are sent to an optical switch where they may be cross-connected add(ed)/drop(ped). Finally the full sets of channels having different wavelengths are combined into WDM signals by the multiplexers and sent to the output ports.

As shown in this FIG. 2, channels to be dropped locally are sent to the lower K drop ports of the output side of the (N+K)×(N+K) optical switches; while signals added locally are connected to the lower K add ports of the input side of the optical switches and then switched to the multiplexers. With non-blocking optical switches, no matter which input port a channel comes from, it can be always dropped to the same transponder. This is very important in a WXC node since an affected channel may be rerouted to a different input port of the node when network restoration is triggered by a link or node failure in a mesh network for example.

However, since each optical switch handles multiple channels of the same wavelength, the maximum number of channels that can be dropped simultaneously for each wavelength is limited to K in the WXC node. When the number of channels having wavelength Xi dropped in the node is less than K, the spare transponders can not be used for any other wavelengths—if no additional transponder sharing mechanisms are equipped in the node. Therefore the transponders equipped for each wavelength must be able to handle the maximum possible number of channels to be dropped in the node, and the add/drop port-count of the optical switches must be high enough for any possible situation. This imposes certain restrictions to network provisioning when the traffic changes dynamically, and the cost of equipments is increased.

Centralized Resource Management in WSS based WXC Node

WSS based WXC Node: A WSS-based WXC node of degree-N (N input ports and N output ports, or N×N) is usually comprised of N ROADM modules, and each ROADM module is interconnected with all other (N−1) modules with (N−1) pairs of drop and add service ports.

Figure 3A:
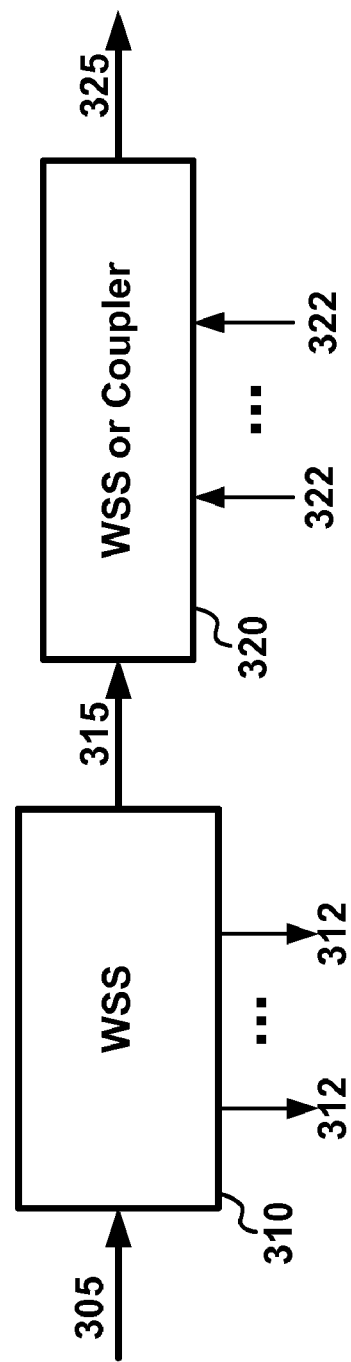
FIG. 3(A) is a schematic block diagram showing a Wavelength Selective Switch based Reconfigurable Optical Add-Drop Multiplexer.

As illustrated in FIG. 3(A), a ROADM module includes a drop-WSS 310 for dropping channels and an add-WSS 320 (or optical coupler) for adding local channels. The input WDM signals 305 can either be dropped to one of the drop ports 312, or be passed through (via 315) the add-module 320 and subsequently to the output ports 325. Since every drop port 312 of the WSS can handle multiple wavelengths, additional demultiplexers may be required to separate individual wavelengths dropped from a drop port.

Figure 3B:
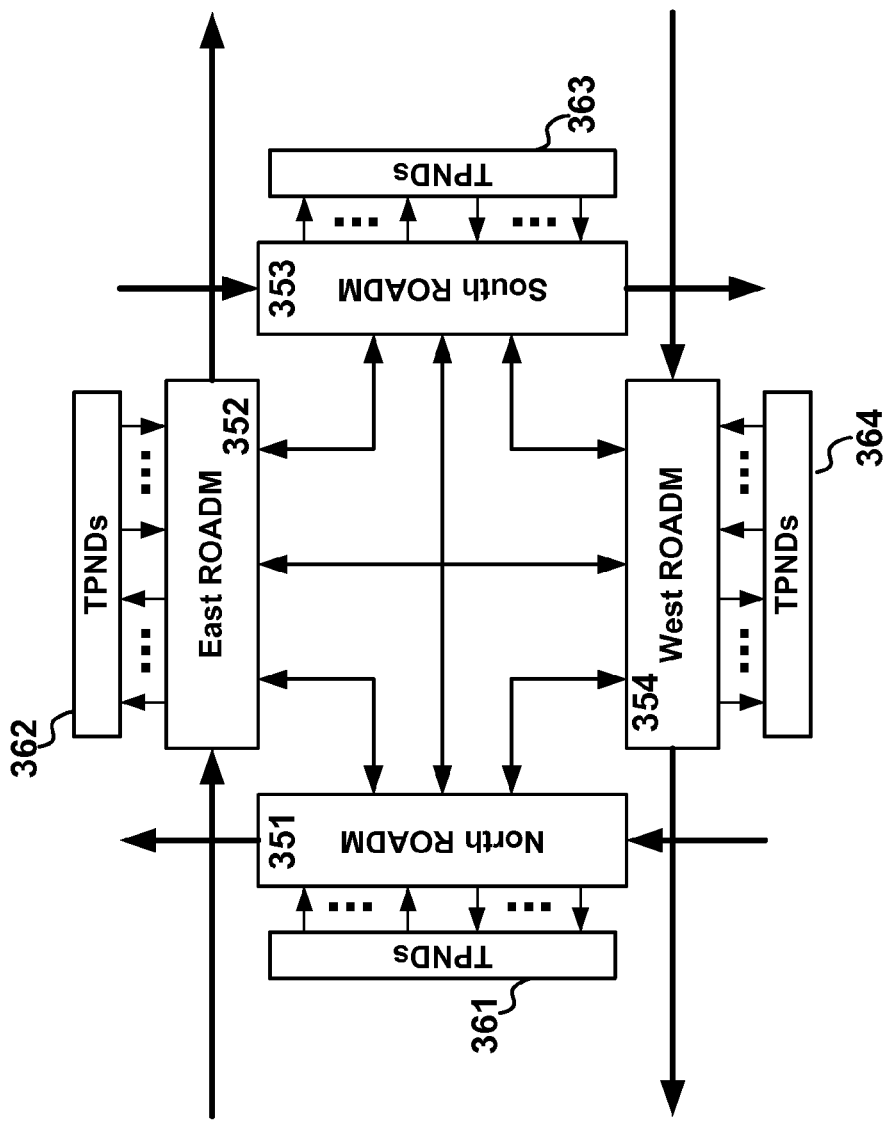
FIG. 3(B) is a schematic block diagram showing a Wavelength Selective Stitch based 4×4 Wavelength Cross Connect Node according to the present invention.

As illustrated in FIG. 3(B), a 4×4 WSS-based WXC node includes four ROADM modules (351, 352, 353, 354) which in FIG. 3(B) are designated as "North", "South", "East", and "West", respectively. Each ROADM module is interconnected with the other three modules with three pairs of add and drop ports so that the channels can be cross-connected between different directions.

Each ROADM module handles the traffic from one direction. For example, The East ROADM module drops the selected channels only from the east input port, and sends the rest, with some local adding signals, to the output port.

At this point, those skilled in the art will recognize that centralized resource management and in particular centralized transponder management (CTM) is a problem in WSS based WXC nodes. More particularly and unlike a conventionally structured WXC node, the channels to be dropped in a WSS based WXC node are pre-selected inside the WSS. In addition, the transponders within the WXC node are typically divided into several banks, each of which is dedicated for the adding/dropping channels of one direction.

By way of an example and with continued reference to FIG. 3(B), the transponders associated with the East ROADM module (361, 362, 363, 364) are physically isolated from those transponders associated with the other ROADM modules (North, South, West), and therefore cannot be reconfigured to accommodate channels dropped from these other ROADM modules, even when there are spare transponders in that East transponder bank. The same is true for all other banks of transponders. As a result, when a link connected to the East input is broken and affected traffic is re-routed to the South input—for example—affected channels—after being dropped from the South ROADM module—cannot be sent back to their original transponders in the East bank. To terminate these channels, backup transponders would have to be pre-established in the South bank. Therefore—and as can be readily appreciated by those skilled in the art—extra transponders have to be pre-provisioned in the WXC node, otherwise affected traffic could not be recovered in the event of network failure.

Centralized Resource Management

Advantageously, and according to an aspect of the present invention, a number of exemplary configurations for centralized resource management in the WSS based WXC node are now described. As noted earlier, these configurations advantageously solve two major problems associated with the prior art. The first problem—a blocking problem—is that situation encountered in the event of network restoration and reconfiguration. As appreciated by those skilled in the art, this blocking problem is not encountered in conventional WXC, but it is a fatal problem in a WSS-based WXC node because re-routed channels can not be sent to their original transponders.

The second problem solved by the instant invention is that encountered when transponders are shared among different wavelengths. As those skilled in the art will recall, this problem is also associated with conventional WXC nodes. According to an aspect of the present invention however, there is no longer any limitation to how many channels of the same wavelength that can be dropped simultaneously in a node. Whenever there is a transponder available in the node, any channel can be dropped to it. As we shall now show, the present invention advantageously provides three separate approaches to these problems namely, a fully switching Centralized Resource Management scheme; a partial switching Centralized Resource Management scheme and a switchless Centralized Resource Management scheme.

Fully Switching Centralized Resource Management (CRM) Scheme

Figure 4:
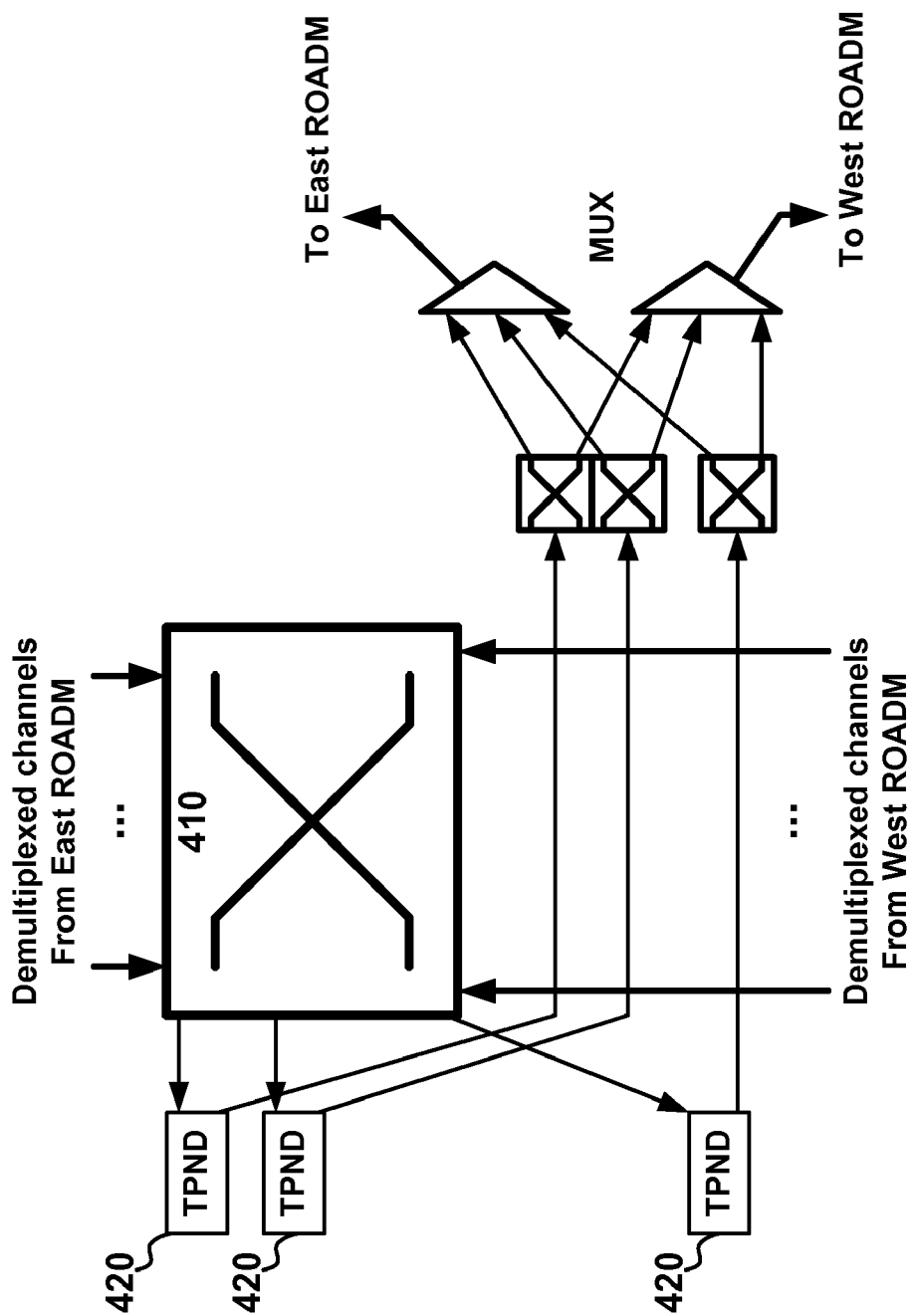
FIG. 4 is a schematic diagram showing a fully switching system employing centralized transponder management according to the present invention in a 2×2 Wavelength Cross Connect node.

The fully switching CRM scheme employs a high port-count optical switch to interconnect any dropped and demultiplexed channels with the transponders. As illustrated in FIG. 4, a (N×P)×(N×P) 410 optical switch is used to manage the transponders 420 in a N×N WXC node, in which a maximum number of P channels are dropped from each directional ROADM module in normal condition.

As those skilled in the art can readily appreciate, one advantage of this scheme is that every drop channel can be switched to any transponder in a non-interruptive way, which means all other drop channels will not be interrupted during the switching. Advantageously, extra flexibility is provided to network provisioning when tunable transponders are preferably used in the WXC node.

However, the cost of this scheme is high, given the fact that the (N×P)×(N×P) optical switch 410 is relatively expensive. Besides, redundancy is critical in this approach—the optical switch must have extra ports so as to tolerate certain internal failure since it bridges all the drop channels to the transponders.

Partially Switching CRM Scheme

Figure 5:
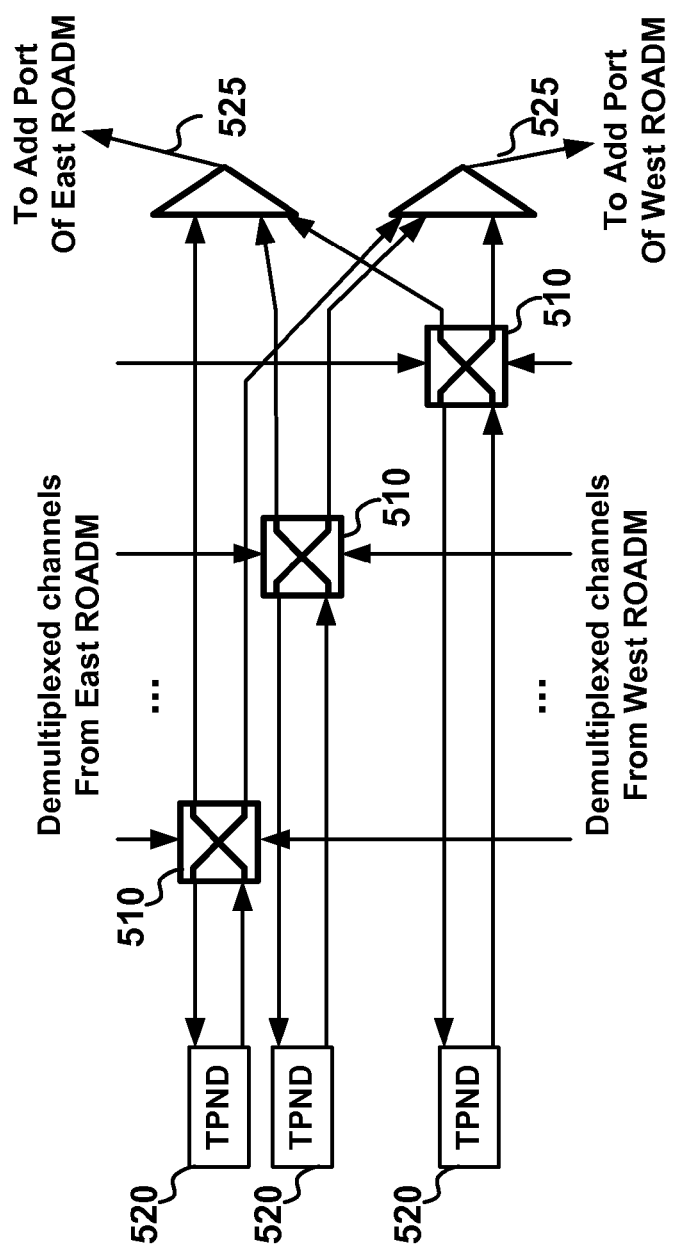
FIG. 5 is a schematic diagram showing a partially switching CRM system in a 2×2 WXC node according to the present invention.

To reduce the high cost incurred by the high-port-count switch, a partially switching non-blocking CRM scheme uses multiple lower-port-count optical switches to manage the transponders. As illustrated in FIG. 5, in a 2×2 WXC node, two channels of the same wavelength but dropped from different ROADM modules are sent to a 2×1 optical switch 510, in which only one of the two channels is selected and sent to a transponder 520. At the same time, the output of the transponder (the add channel) is sent to one of the two add ports 525 selected by the 1×2 optical switch.

When both channels connected to a 2×1 optical switch need to be dropped, one of them must be reconfigured to a different drop port by switching the WSS in the ROADM module. As a result, the second channel is sent to a spare transponder.

Those skilled in the art will quickly recognize one advantage of this scheme is that the cost is significantly reduced because only low-port-count optical switches are required as the management system makes use of the switching capability of the WSS device inside the ROADM module. With tunable transponders, any drop channel can also be switched to a spare transponder without any interruption to the existing services.

Unfortunately, this scheme too also faces the same reliability issues as the fully switching CRT scheme faces because optical switches are still used to bridge the drop channels to the transponders. Accordingly, redundant mechanisms are required to protect the connection between the drop channels and transponders when one or more switches become malfunctioning.\

Switchless CRM Scheme

Figure 6:
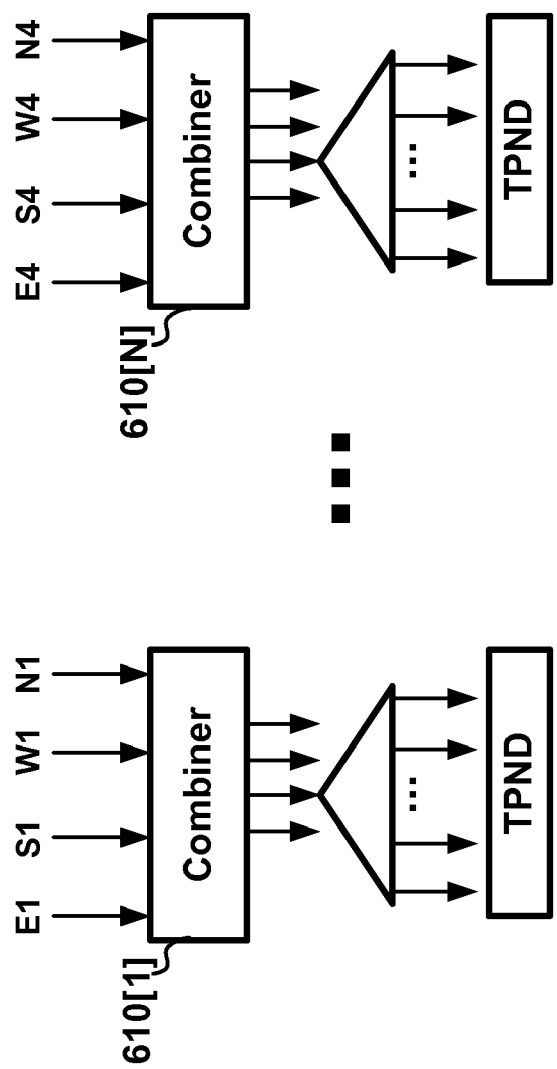
FIG. 6 is a schematic diagram showing a switchless CRM system in a 4×4 WXC node according to the present invention.

To further reduce the cost and enhance the reliability of the CRM system, a scheme without any optical switch is shown. As illustrated in FIG. 6, a WDM combiner 610[1] ... 610[N], i.e., an optical coupler or tunable multiplexer, is used to mix the dropped channels from four service ports, one of which belongs to each ROADM module of the 4×4 WXC node.

In the 4×4 WXC node, the CRM system according to the present invention requires each ROADM module to provide up to four service ports for the drop channels so that the node can provide 100% add/drop capability.

By way of example, suppose the node supports a total of 40 wavelengths at each input port. Then in normal working condition, the four service ports are responsible for dropping channels from $\lambda_1$ to $\lambda_{10}$, from $\lambda_{11}$ to $\lambda_{20}$, from $\lambda_{21}$ to $\lambda_{30}$, and from $\lambda_{31}$ to $\lambda_{40}$, respectively. We name the four service ports of the East ROADM module as E1, E2, E3, and E4, and those of the South ROADM module as S1, S2, S3, and S4. Others on the North and West ROADMs, are similarly named.

Additionally, the service ports are grouped. One service port with different wavelengths from each ROADM module, e.g., E1, S2, W3, and N4, are grouped and connected to a combiner, so the dropped channels at these service ports are multiplexed by the combiner. Then a demultiplexer, or an array of demultiplexers, is used to separate the individual wavelengths and send them to the respective transponders.

The other three groups of service ports, (E2, S3, W4, N1), (E3, S4, W1, N2) and (E4, S1, W2, N3), are also combined and demultiplexed to the transponders, respectively.

Figure 7B:
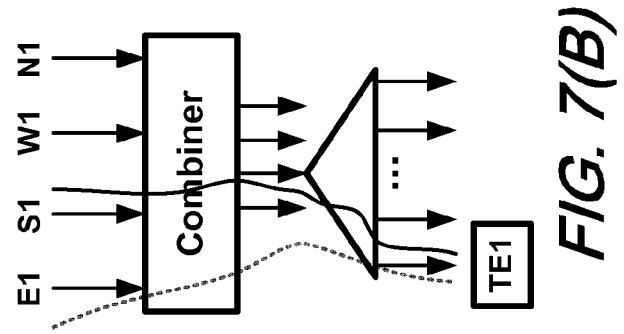
FIG. 7(B) is a schematic showing service restoration in a switchless CRM system according to the present invention.
Figure 7A:
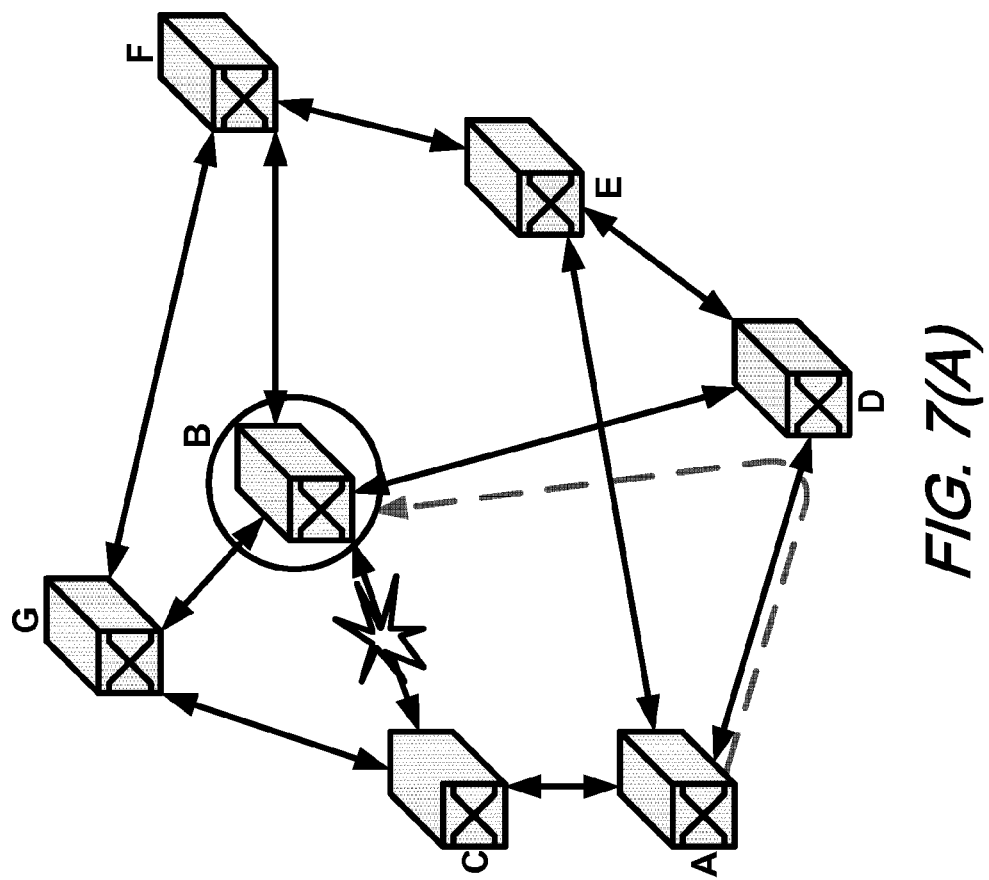
FIG. 7(A) is a schematic diagram of a WXC node in a representative mesh optical network according to the present invention.

Suppose the 4×4 WXC node is used in a mesh network, as illustrated in FIG. 7A. With specific simultaneous reference to that FIG. 7A and FIG. 7B, consider the case where channel $\lambda_{E1}$ having wavelength $\lambda_1$ is arriving from the East input port and is dropped to service port E1 and sent to transponder TE1. When a link failure occurs in the network, e.g., the fiber connected to the East Input is broken, channel $\lambda_{E1}$ can neither be sent to East input, nor to transponder TE1 directly. With network restoration, assume channel $\lambda_{E1}$ is rerouted to the South input port when channel $\lambda_{S1}$ (also at wavelength $\lambda_1$) is not in use. Then channel $\lambda_{E1}$ should be dropped to service port S2 so that it can be sent to the same combiner C1 as before. So in the protection state, service port S2 handles channels from $\lambda_{S11}$ to $\lambda_{S20}$, plus the rerouted channel $\lambda_{E1}$. After combination and demulplexing, channel $\lambda_{E1}$ will still be sent to the same transponder TE1. As a result, the service carried on channel $\lambda_{E1}$ is recovered.

Advantageously, the switchless CRM system according to the present invention is also capable of handling dynamic traffic requirements at wavelength level. Suppose in the above network, in the beginning, both the East and South ROADM module drop two channels, channel $\lambda_{E1}$ and $\lambda_{E2}$, and channel $\lambda_{S3}$ and $\lambda_{S4}$, in the WXC node. So two transponders, TE1 and TE2, are equipped for the East ROADM module, and another two, TS3 and TS4, are equipped for the South ROADM module, respectively, so as to terminate the above drop channels. When traffic changes, there may be only one channel, channel $\lambda_{E1}$, need to be dropped in the East ROADM module; while there are three channels, channel $\lambda_{S2}$, $\lambda_{S3}$, and $\lambda_{S4}$, to be dropped in the South ROADM module, then the new channel, channel $\lambda_{S2}$, can be dropped together with $\lambda_{S3}$, and $\lambda_{S4}$ to the same service port. The three channels will be combined with channel $\lambda_{E1}$ and demultiplexed so that the extra channel, channel $\lambda_{S2}$, can be sent to the spare transponder TE2.

One difference between the switchless scheme and the above two switching schemes is that it does not use any extra optical switch in the CRM system. Instead, it uses only passive optical components that have no moving parts. As a result it is the both the most reliable solution and the least expensive.

Besides, the switchless CTM system connects directly to the service ports of the ROADM modules, instead of the output ports of the demultiplexers in the other two schemes. Apparently the port-count of the devices used in switchless CTM system is far less than that of the other two switching CTM systems because each service port may carry multiple drop channels. This also means less management complexity, higher reliability and lower cost.

Algorithms for Switchless CRM Schemes

Suppose a channel having wavelength S coming into the I-th ROADM module of an N×N WXC node is denoted as $\lambda_{I, S}$. And suppose the WXC node provides 100% add/drop capability, then each ROADM module should provide N service ports for the drop channels, and N service ports for the add channels. And the drop channels of each ROADM module are divided into N groups.

In normal condition, the waveband and the wavelengths contained in it at the K-th service port of ROADM module I are as below:

$$B(I,K)=\{\lambda_{I,S} | [M/N] \times (K-1)+1 \leq S \leq [M/N] \times K\} \quad [1]$$

where M is total number of incoming wavelengths in each ROADM module.

The switchless CTM scheme combines one waveband containing different wavelengths from every ROADM module in a coupler. So the wavebands combined in the L-th coupler include:

$$\{B(I,K) | I=1,2,\ldots N; K=(I-L)+1, \text{ if } I \geq L\} \cup$$
$$\{B(I,K) | I=1,2,\ldots N; K=N+(I+L)+1, \text{ if } I<L\} \quad [2]$$

The wavelengths contained in the wavebands expressed in (2) are demultiplexed and sent to their respective transponders.

Suppose when network failure occurs, channel $\lambda_{I, S}$ is interrupted and rerouted to another ROADM module J because channel $\lambda_{J, S}$ is not in use. In order to send the rerouted channel $\lambda_{I, S}$ to its original transponder, it cannot be dropped to the service port where $\lambda_{J, S}$ was dropped. Instead, it should be dropped to the service port Q of the ROADM module J, and Q can be obtained from the following algorithms:

```
// Begin
//First, get the values
    int step, service_port, coupler, waveband;
    int K, L, M, N, I, J, S, Q;
    printf("Please input the number of the wavelengths M\n");
    gets(&M);
    printf("Please input the number of the node degree N\n");
    gets(&N);
    printf("Please input the sequence number of the previous ROADM I\n");
    gets(&I);
    printf("Please input the sequence number of the current ROADM J\n");
    gets(&J);
    printf("Please input the wavelength of the affected channel S\n");
    gets(&S);
//Second, find out which service port, K, that channel λ_{I, S} was dropped from
//in ROADM I
    step = M / N;
    service_port = 0;        //initialization
    while (S > 0)
    {
        S -= step;
        service_port ++;
        K = service_port;
    } //while service port
//Third, find out which coupler, L, that channel λ_{I, S} was sent to
    for (coupler =0; coupler <N; coupler ++)
    {
        if (I >= coupler +1)
        {
            if (K == coupler) L = coupler + 1;
        }
        else
        {
            if (K == N+I-coupler) L = coupler +1;
        }
    } //for coupler
//Fourth, find out which waveband from ROADM J is sent to coupler Q
    if (J >= L)        Q = J – L + 1;
    else               Q = N + J – L + 1;
//End
```

Therefore, the rerouted channel $\lambda_{I, S}$ should be dropped to the Q-th service port in ROADM J so that it can be sent back to its original transponder.

Experiments with Switchless CRM Schemes

Figure 8B:
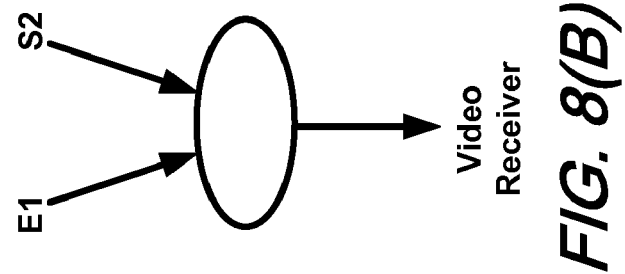
FIGS 8(A) and 8(B) are schematics showing representative configurations according to the present invention.
Figure 8A:
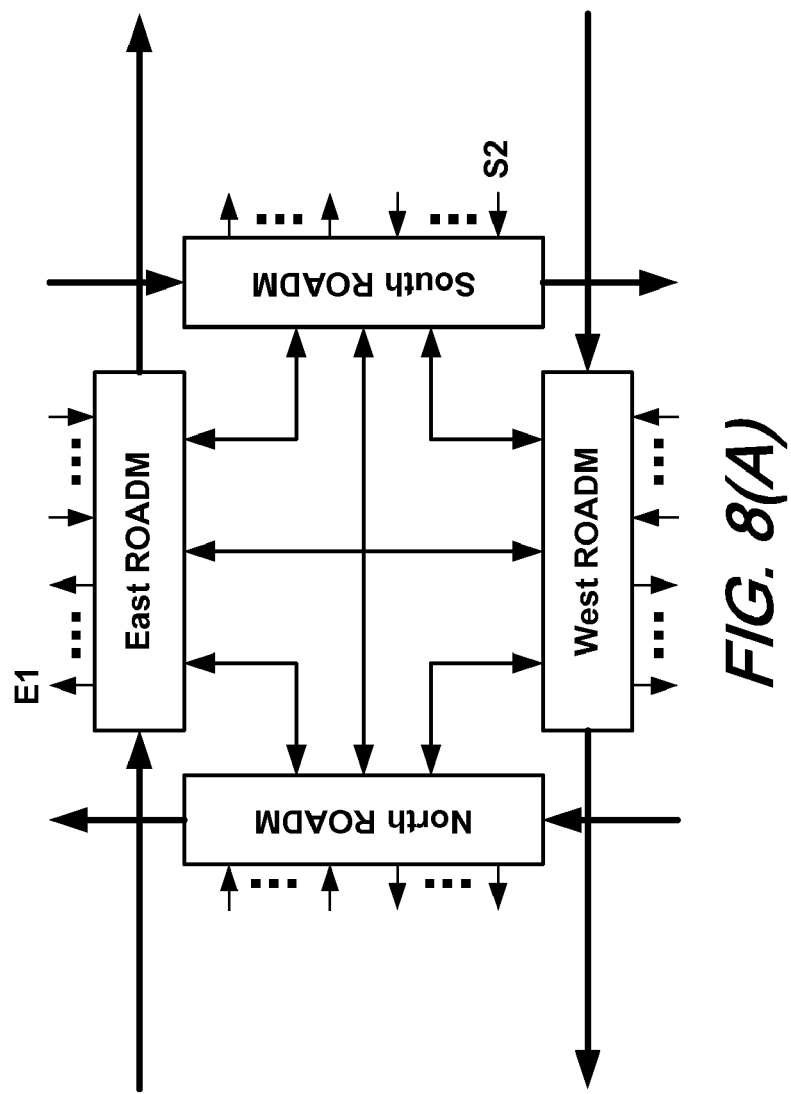

An experiment with a switchless CTM system was conducted with a WSS based 4×4 WXC node, in which the transponders are managed between the East and South input ports. As illustrated in FIG. 8, a coupler, C, is used to combine the channels dropped from the service port E1 and S2 (first and second service ports of the East and South ROAMD modules, respectively).

In the experiment, a live video signal is used to demonstrate the CTM system. In normal condition, the video signal carried on channel 193.0 THz (1553.33 nm) is launched into the East Input port and dropped to service port E1 in the East ROADM module, and then sent to a video receiver. To simulate the link failure and network restoration, the patch cord carrying the video service is unplugged from the East Input and plugged to the South Input. Then the node management configures the video channel to the service port S2 of the South ROADM module. From there the video signal is sent to the coupler C and back to the video receiver, and the service is recovered.

At this point, while we have discussed and described our invention using some specific examples, those skilled in the art will recognize that our teachings are not so limited. Still further, the number of arms in a particular auxiliary interferometer is also a matter of design choice so long as the principles discussed herein are maintained. Accordingly, our invention should be only limited by the scope of the claims attached hereto.

The invention claimed is:

1. A switchless wavelength cross-connect system comprising:
    N Reconfigurable Optical Add Drop Multiplexers (ROADM) each having N DROP ports and N ADD ports wherein the DROP ports are arranged into N groups of DROP ports, wherein each one of the N groups includes a DROP port from each of the N ROADM;
    N combiners each optically connected to a respective one of the N groups of DROP ports, each one of the N combiners having N outputs;
    N demultiplexers, each one of which being optically connected to the N outputs of an individual one of the N combiners, each of the N demultiplexers having N outputs; and
    N transponders, each one of which being optically connected to the N outputs of one of the N demultiplexers.

2. The switchless system of claim 1 wherein N is 4.

3. The switchless system of claim 2 wherein the combiner is a 4×4 optical coupler.

* * * * *